(12) United States Patent
Clube (10) Patent No.: US 7,522,323 B2
(45) Date of Patent: Apr. 21, 2009

(54) METHOD AND APPARATUS FOR PRINTING A PATTERN WITH IMPROVED FOCUS CORRECTION AND HIGHER THROUGHPUT

(76) Inventor: Francis Stace Murray Clube, Chemin des Ribaudes 26, Neuchâtel (CH) CH-2074

( * ) Notice: Subject to any disclaimer, the term of this patent is extended or adjusted under 35 U.S.C. 154(b) by 636 days.

(21) Appl. No.: 11/256,608

(22) Filed: Oct. 24, 2005

(65) Prior Publication Data
US 2007/0091397 A1     Apr. 26, 2007

(51) Int. Cl.
    *G02B 5/32*     (2006.01)
    *G02B 26/10*    (2006.01)

(52) U.S. Cl. .............................. 359/17; 359/900; 430/1; 355/2

(58) Field of Classification Search ................ 359/1, 359/15, 17, 35, 900; 430/1, 2, 4, 321; 355/2, 355/53
    See application file for complete search history.

(56) References Cited

U.S. PATENT DOCUMENTS 5,640,257 A * 6/1997 Clube .......................... 359/30
5,695,894 A * 12/1997 Clube .......................... 430/1
6,005,666 A * 12/1999 Dandliker et al. .......... 356/505
2006/0068305 A1* 3/2006 Iriguchi ....................... 430/22

* cited by examiner

*Primary Examiner*—Alessandro Amari (57) ABSTRACT

A method for printing a pattern from a hologram mask into a photosensitive layer on a substrate, which method includes arranging the hologram mask on a coupling element, arranging the substrate so that it is substantially parallel with the hologram mask and separated from it by an amount substantially corresponding to the focal distance of the hologram mask, reconstructing the pattern recorded in the hologram mask by scanning an exposure beam of substantially collimated across the hologram mask while continuously measuring the local separation between the hologram mask and substrate in at least two locations where the pattern is being reconstructed by scanning at least two focus beams across the hologram mask, and continuously adjusting the separation and the angle of tilt between the hologram mask and substrate in order that the pattern reconstructed from the hologram mask is accurately focussed onto the photosensitive layer on the substrate.

16 Claims, 8 Drawing Sheets

METHOD AND APPARATUS FOR PRINTING A PATTERN WITH IMPROVED FOCUS CORRECTION AND HIGHER THROUGHPUT

The present invention relates to the field of total internal reflection (TIR) holography, and in particular to TIR holography as employed for photolithography.

The prior art teaches that an important application of TIR holography is for printing high-resolution microcircuit patterns, especially on glass substrates for manufacturing certain flat panel displays (e.g. U.S. Pat. No. 4,917,497, U.S. Pat. No. 4,966,428, U.S. Pat. No. 5,640,257, U.S. Pat. No. 5,695,894 and U.S. Pat. No. 6,657,756). According to the method, a hologram mask is recorded from a conventional chrome mask bearing a pattern of features by firstly placing the chrome mask in close proximity to a holographic recording layer coated to a glass plate that is arranged on a glass prism. The chrome mask is then illuminated with an object laser beam whilst simultaneously illuminating the holographic recording layer through the prism with a mutually coherent reference laser beam with an angle of illumination such that the reference beam is totally internally reflected from the surface of the holographic layer. The optical interference of the light transmitted by the chrome mask with the totally internally reflected reference beam is recorded by the photosensitive material of the holographic layer, which is subsequently fixed by an appropriate processing step, to form the hologram mask. The original mask pattern can then be regenerated, or reconstructed, from the hologram mask by re-mounting the hologram mask to a glass prism and illuminating the hologram mask through the prism with a single laser beam. The reconstructed image, which is formed at the same distance from the hologram mask as was the holographic layer from the chrome mask during recording, may be printed into a layer of photoresist on a silicon wafer or on a glass plate.

Because of the close proximity between the holographic layer and mask during recording and between the hologram and substrate during reconstruction, the TIR holographic method provides a very high numerical aperture (~1) in comparison with traditional photolithographic methods, which enables a relatively high imaging resolution for a given exposure wavelength: for example, 0.4 µm features may be printed with a wavelength of 364 nm. Further, TIR holographic lithography possesses no trade-off between feature resolution and pattern size, so may be employed to print, for example, a 0.4 µm-resolution pattern of dimensions 150 mm×150 mm in a single exposure step.

Lithographic exposure systems based on this technique, known as holographic mask aligners (HMAs), have been developed and commercialised. In this equipment the hologram mask is mounted to a face of a 45°, 45°, 90° glass prism with a layer of transparent fluid at the interface between the two to provide an optically continuous body. The substrate to be printed is mounted to a vacuum chuck and positioned parallel and in proximity to the hologram mask using a multi-axis positioning stage. Exposure is performed by scanning, in a raster pattern, a laser beam with a circular or elliptical cross-section and a Gaussian intensity profile over the hologram mask through the prism. The stepping distance of the beam between successive scan lines of the raster scan pattern is chosen in relation to the beam diameter in order that the time-integrated exposure of the hologram exposure is highly uniform. During the exposure a focus beam is additionally scanned synchronously with the exposure beam across the hologram mask for continuously measuring the local separation of the hologram mask and substrate where the pattern is being instantaneously reconstructed, and in response to these measurements the separation is continuously adjusted by displacements of the substrate positioning stage so that the local separation remains substantially constant. This operation ensures that the pattern is accurately and uniformly printed in focus on the substrate even if the substrate is not especially flat.

Holographic mask aligners generally also incorporate an alignment system to enable a higher-level pattern recorded in a hologram mask to be accurately aligned and printed with respect to a lower-level pattern previously printed on the substrate surface. This is important for fabricating the complex, multi-layer structures of microcircuits. The alignment system typically comprises two or more microscopes for illuminating and imaging alignment marks included in the hologram mask and on the substrate surface. From the images of the marks captured on the microscopes' CCD cameras, image processing software calculates the relative position of the higher-level pattern in the hologram mask with respect to the lower-level pattern on the substrate, following which actuators in the substrate positioning system displace the substrate to accurately align the two patterns. The higher-level pattern is then printed onto the lower-level pattern.

On certain HMA systems the substrate's multi-axis positioning stage enables a substrate to be laterally displaced by large distances with respect to the hologram mask thus permitting the pattern in the hologram mask to be printed a number of times onto the substrate surface using a "step-and-repeat" exposure sequence. For example, a pattern of dimensions 120 mm×120 mm recorded in the hologram mask may be printed 12 times onto a substrate of dimensions 400 mm×500 mm.

The different sub-systems and operations on the HMA equipment are integrated with a central control unit with user-friendly interfaces for defining the parameters required for the particular printing operations, and for enabling a completely automatic exposure cycle for a batch of substrates.

Since HMA systems are intended for printing microcircuit patterns, principally for flat panel display applications, the throughput of the equipment, in terms of plates printed per hour, is very important. For this reason the time it takes the equipment to print individual patterns from a hologram mask onto the substrate needs to be minimised. With the scanning exposure currently employed on HMA equipment it is difficult to reduce the time taken for the exposure beam to scan in a raster pattern over the hologram mask whilst ensuring both a high uniformity of illumination and also an accurate focus of the pattern printed onto the substrate. The maximum velocity of the exposure beam in the scan lines of the raster pattern is dependent on the speed with which the separation of the hologram mask and substrate can be continuously measured by the focus system and corrected by displacement of the substrate, whereas the maximum step distance of the exposure beam between successive scan lines in a raster pattern is dependent on the size of the exposure beam which is limited by the flatness of the substrate and the DoF of the high-resolution features in the pattern being reconstructed.

It is an object of the present invention to provide a method and apparatus for printing a pattern from a hologram mask onto a substrate that allows a reduction of the time taken to print the pattern. It is a further object of the present invention to provide a method and apparatus that enables the pattern reconstructed from the hologram mask to be printed more accurately in focus onto the substrate, allowing the fabrication of microcircuits with improved performance.

According to a first aspect of the present invention there is provided a method for printing a pattern from a total internal reflection hologram of a hologram mask into a photosensitive layer on a substrate, which method includes:

a) arranging the hologram mask on a first face of a coupling element;

b) arranging the substrate so that it is substantially parallel with the hologram mask and such that the photosensitive layer is separated from the hologram by an amount substantially corresponding to the focal distance of the hologram mask;

c) reconstructing the pattern recorded in the hologram by scanning an exposure beam of substantially collimated light across the hologram mask through a second face of the coupling element while simultaneously measuring the local separation between the hologram and photosensitive layer in at least two locations where the pattern is being instantaneously reconstructed by the exposure beam by scanning at least two focus beams across the hologram mask through the second or a third face of said coupling element and, in response to said measurements by the focus beams, continuously adjusting both the separation of the hologram mask and substrate and the angle of tilt between them in at least the plane orthogonal to the direction of motion of the scanning beams, in order that the pattern reconstructed from the hologram is accurately printed in focus into the photosensitive layer.

Advantageously the pattern may be reconstructed by an exposure beam scanning in a raster pattern comprising a sequence of overlapping scan lines parallel to first direction, whilst the focus beams continuously measure the local separation of the hologram mask and substrate at locations separated in a direction orthogonal to the first direction and the separation of the substrate and hologram mask and the tilt angle between them in the plane orthogonal to the first direction are continuously adjusted in response to said measurements in order that the pattern is accurately printed in focus. In this case, the exposure beam may either be in the form of an elongated strip of light whose intensity profile in the plane of the hologram and in a direction orthogonal to the first direction is substantially flat with tapered ends, or it may be substantially Gaussian in at least the direction orthogonal to the first direction.

Advantageously and alternatively, the pattern may be reconstructed by scanning an exposure beam in a single rectilinear scan line across the hologram mask ands by using an exposure beam in the form of an elongated strip of light whose intensity profile in the plane of the hologram and in a direction orthogonal to the scan line is substantially flat across that part of the beam reconstructing the pattern recorded in the hologram, by using the focus beams to measure the local separations between the hologram mask and substrate in at least two locations separated in a direction orthogonal to the scan line, and by continuously adjusting the angle of tilt between the hologram mask and substrate in the plane orthogonal to the scan line.

Using the method of the invention, the adjustments of the separation and angle of tilt between the hologram mask and substrate may be performed either by displacements of the substrate or by displacements of the prism and hologram mask, or by a combination of the two.

According to a second aspect of the present invention there is provided an apparatus for printing a pattern from a total internal reflection hologram of a hologram mask into a photosensitive layer on a substrate, which apparatus includes:

a) a coupling element with a first face for arranging the hologram mask thereon;

b) a carrier for arranging the substrate thereon;

c) at least one positioning means having actuators for arranging that the substrate is substantially parallel to and in proximity to the hologram mask and for adjusting the separation of the hologram and photosensitive layer and the angle of tilt between them in at least one of two orthogonal planes;

d) an exposure means for generating a beam of substantially collimated light and for reconstructing the pattern recorded in the hologram by scanning said beam over the hologram mask through a second face of the coupling element;

e) a focus means for generating at least two focus beams, scanning said beams over the hologram mask through the second or a third face of the coupling element, and for simultaneously measuring the local separation between the hologram and photosensitive layer in at least two locations where the pattern is being instantaneously reconstructed by said scanning exposure beam;

f) a control means for adjusting using the positioning means the separation of the hologram mask and substrate and the angle of tilt between them in at least one of two orthogonal planes in response to said measurements by the focus means so that the pattern reconstructed from the hologram by the exposure means is accurately printed in focus into the photosensitive layer said exposure beam;

Advantageously, the exposure means scans the beam in a raster pattern comprising a sequence of parallel scan lines, and the focus means measures the local separation of the hologram mask and substrate in at least two locations separated in a direction orthogonal to the first direction. In this case, it is preferable that the exposure means generates a beam either in the form of an elongated strip of light whose intensity profile in the plane of the hologram and in a direction orthogonal to the scan lines is substantially flat with tapered ends, or it may be substantially Gaussian in the direction orthogonal to the scan lines.

Advantageously and alternatively, the exposure means in the above apparatus may scan the beam in a single rectilinear scan line across the hologram mask and generate a beam in the form of an elongated strip of light whose intensity profile in the plane of the hologram and in a direction orthogonal to the scan line is substantially flat across that part of the beam that reconstructs the pattern recorded in the hologram, and the focus means measure the separation between the hologram mask and substrate at locations separated in a direction orthogonal to the scan line.

A single positioning means may be provided for adjusting the separation and angle of tilt between the hologram mask and substrate in response to the measurements by the focus means, which displaces just the substrate and carrier. Alternatively, a single positioning means may be provided that displaces just the hologram mask and prism. Another possibility is that two positioning means are provided, one of which displaces the substrate and carrier (eg. with coarse resolution) and the other displaces the hologram mask and prism (with fine resolution).

Preferred embodiments of the invention will now be described in greater with reference to the following drawings wherein.

Figure 1:
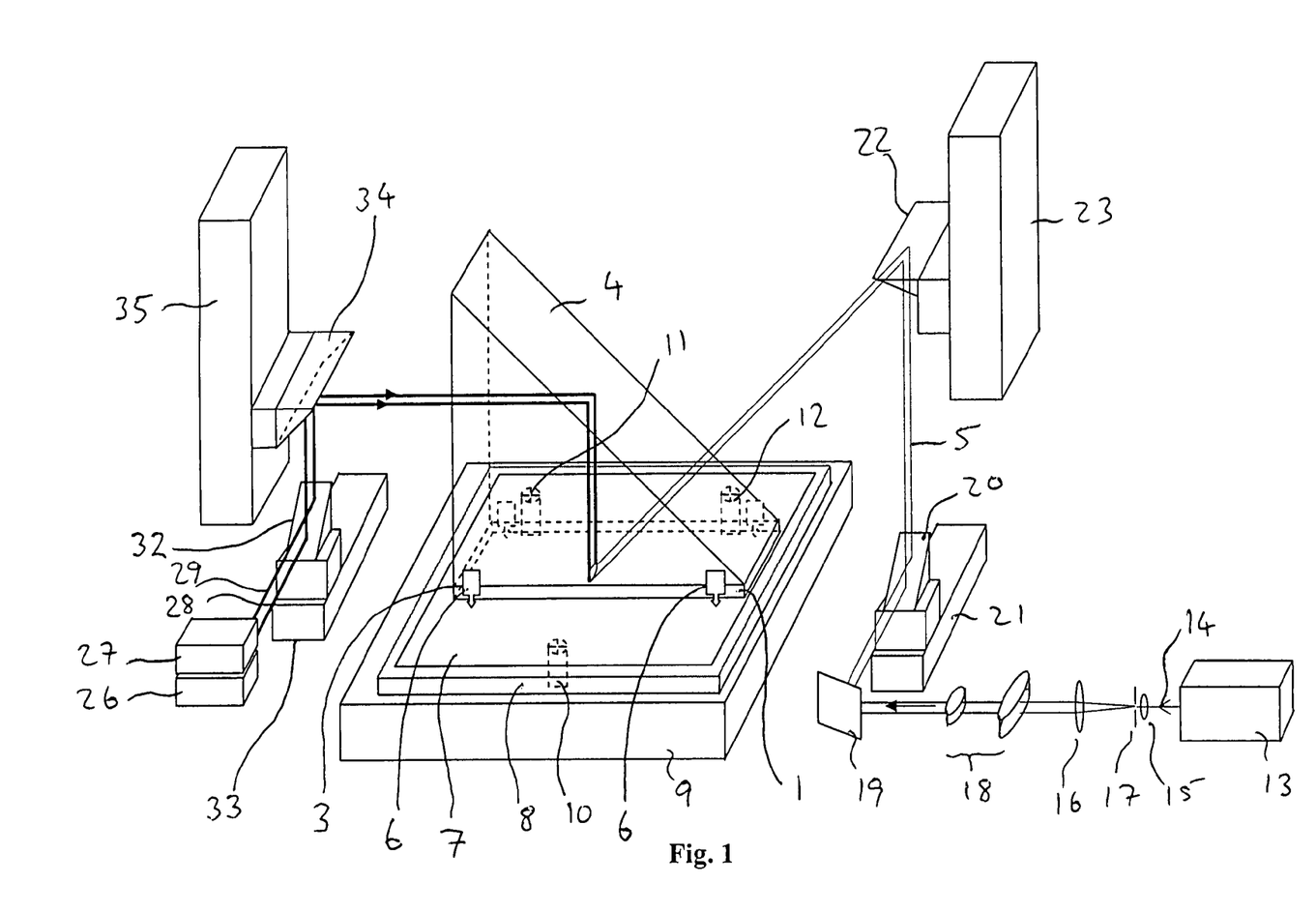
FIG. 1 shows a lithographic system illustrating a first embodiment.
Figure 2:
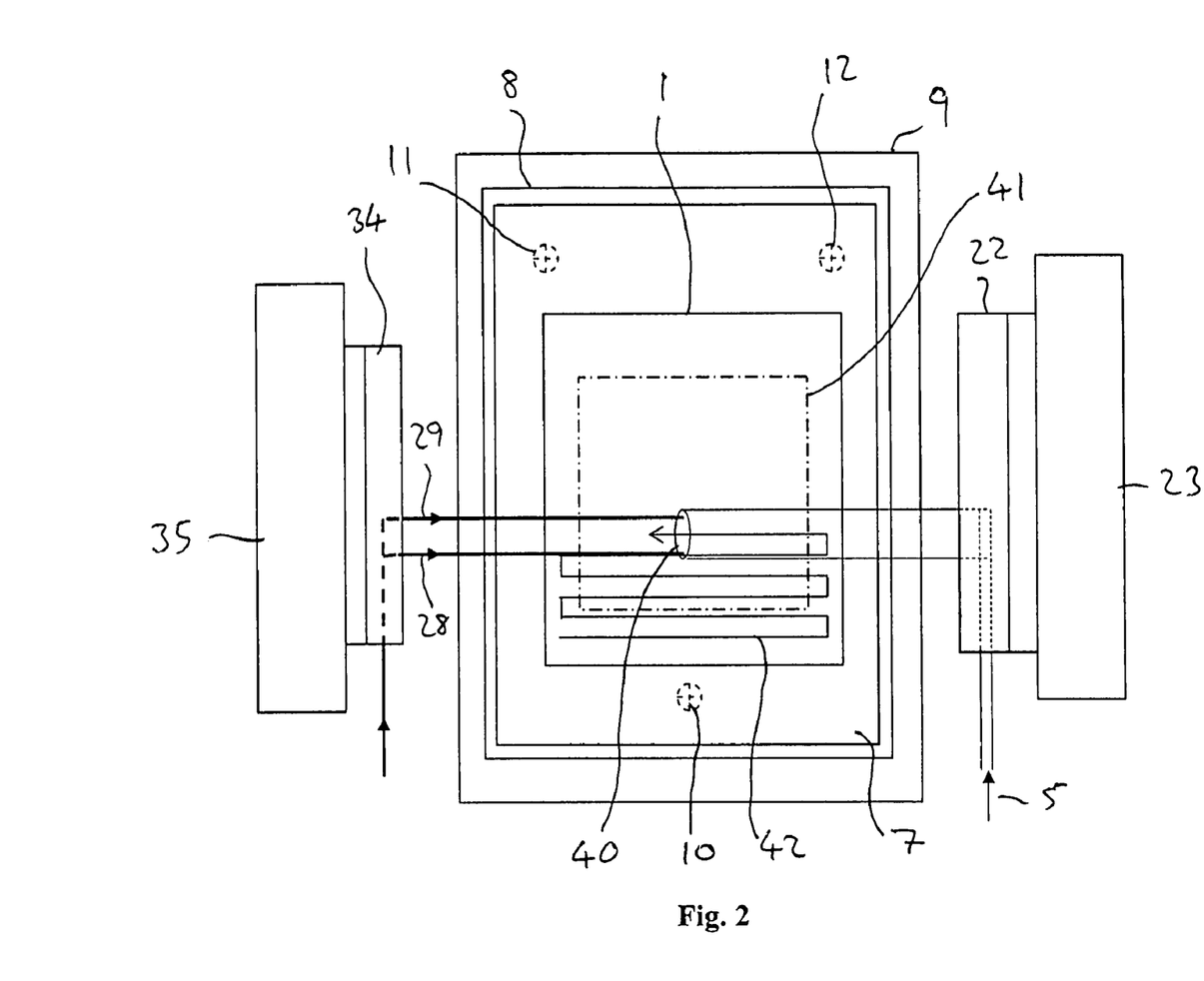
FIG. 2 shows a top-view of certain elements in the first embodiment, illustrating the exposure strategy.

With reference to FIGS. 1 and 2 showing the first embodiment of the invention, a hologram mask 1, consisting of a hologram of a pattern recorded in a layer of a photopolymer material on the lower surface of a glass substrate, is attached by way of thin layer of transparent fluid 3 to the base face of a 45°, 45°, 90° glass prism 4. The purpose of the fluid 3 is to arrange that the prism 4 and hologram mask 1 form an optically continuous body so that an exposure beam 5 can pass from the former to the latter without interruption. The prism 4 is preferably held in a mechanical frame (not explicitly shown in the figure) for supporting and locating the prism 4 and hologram mask 1 on supports (similarly not shown) in the lithographic system. Integrated into the lower faces of this mechanical frame near the four corners of the hologram mask 1 and slightly raised from the plane of the hologram on its lower face, are four proximity sensors 6 for detecting and measuring the distance of a neighbouring surface. Below the hologram mask 1 is a glass substrate 7 onto whose upper surface has been spin-coated a layer of a standard i-line sensitive photoresist, which is held by vacuum on a chuck 8 whose upper surface has been polished to very high flatness. The vacuum chuck 8 is mounted to a substrate positioning system 9 in which are integrated firstly 3 piezo-electric transducers (PZTs) 10, 11, 12 for enabling the substrate 7 to be displaced vertically as well as tilted about orthogonal horizontal axes with high precision, and secondly vertical-axis actuators (not shown in the figure) with longer travel and lower resolution for enabling a coarser adjustment of its position and also pre-levelling of the substrate 7 with respect to the hologram mask 1. The substrate positioning system 9 should ideally also include horizontal-axis PZTs which may be used for aligning a previously printed pattern on the substrate 7 with respect to the pattern recorded in the hologram mask 1 (also requiring alignment marks within the respective patterns and an alignment system on the lithographic machine), and also for correcting Abbé errors caused by tilt corrections, because of the offset distance between the plane of the vertical axis PZTs 10, 11, 12 in the substrate positioning system and the plane of the substrate 7. Advantageously, a 3-axis interferometer system may also be integrated on the machine as part of the substrate positioning system 9, to provide high-accuracy measurements of the position of the lateral position (both translational and angular) of the substrate 7 so that it can be accurately fixed, or stabilised, with respect to the hologram mask 1 during the exposure operation (using a real-time feed-back loop between the measurements of the interferometer system and the horizontal-axis PZTs in the substrate positioning system 9). Such compensation for Abbé errors caused by tilt correction may also be applied for all the other embodiments of the present invention.

To the right of the prism 4 is an exposure system in which an argon ion laser 13 produces an output beam 14 in $TEM_{00}$ mode (ie. it has a Gaussian intensity profile). This beam is first expanded by two lenses 15, 16 to produce a larger beam of collimated light. A pinhole in a metal plate 17 is included between the lenses 15, 16 to filter out optical noise. The resulting beam is then compressed in the horizontal plane by a single pair of cylindrical lenses 18 to produce a beam with an elliptical cross section. This beam 5 is reflected by a mirror 19 to a two-axis scanning system comprising two mirrors 20, 22 mounted on respective translation stages 21, 23. From the second mirror 22 the beam passes through the hypotenuse face of the prism 4 to the hologram mask 1 at the base of the prism 4, illuminating an elliptical area of the hologram mask 1. The function of the second mirror 22 and the upper translation stage 23 is to scan the exposure beam 5 in a line across the hologram mask 1, whereas the function of the first mirror 20 and the lower translation stage 21 is to step the exposure beam 5 across the hologram mask 1 in a direction orthogonal to that of the scan lines.

Alongside the vertical face of the prism 4 is a focus system consisting of two focus measurement modules 26, 27 which are only schematically shown since their composition and operation are adequately described in the prior art. The output beams 28, 29 of the measurement modules 26, 27, which have a broad spectral bandwidth, are incident on a second two-axis scanning system comprising a first mirror 32 mounted on a lower translation stage 33 and a second mirror 34 mounted on an upper translation stage 35. The second mirror 34 reflects the beams 28, 29 such that they are reflected from the hypotenuse face of the prism 4 and illuminate the hologram mask 1 and substrate 7 at normal incidence. As for the exposure system the respective mirrors 32, 34 on the scanning stages 33, 35 allow the two focus beams 28, 29 to be scanned in a line across the hologram mask 1 and stepped in the orthogonal direction. The relative positions of the translation stages of the exposure system 21, 23 and those of the focus system 33, 35 are such that the focus beams 28, 29 are aligned with the major axis of the elliptical area illuminated by the exposure beam 5 and such that the midpoint of the two beams 28, 29 is centred on the elliptical area of the hologram mask 1 illuminated by the exposure beam 5. Further, the separation of the two focus modules 26, 27 is preferably selected such that the separation of the focus beams 28, 29 at the hologram mask 1 corresponds to the $1/e^2$ width of the exposure beam 5 along its major axis.

The partial reflections of the focus beams 28, 29 from the surfaces of the hologram mask 1 and substrate 7 return back through the prism 4 to the respective focus modules 26, 27 where the spectral components of each the signals are electronically analysed to yield the local separations of the hologram mask 4 and substrate 7 where the respective focus beams 28, 29 are illuminating the hologram mask 1. In order that the exposure beam 5 and focus beams 28, 29 can be synchronously scanned across the hologram mask 1, the translation stages 21, 23, 33, 35 of the exposure and focus systems are linked to a central control system (not shown in the figure), as are the two focus modules 26, 27 and the PZTs 10, 11, 12 and the other actuators in the substrate positioning system 9.

The exposure strategy employed with this system is illustrated in FIG. 2 which shows a top-view of certain elements of the apparatus shown in FIG. 1. The area of the hologram being instantaneously illuminated by the exposure beam 5 is indicated by reference numeral 40 and the boundary of the hologram recorded in the hologram mask 1 is indicated by the dashed line 41. The exposure and focus beams 5, 28, 29 are synchronously scanned by the translation stages 21, 23, 33, 35 over the hologram mask 1 in a raster pattern 42 comprising an alternating sequence of scan lines and scan steps. The distance of the scan steps between successive scan lines is preferably selected to be ~40% of the $1/e^2$ width of the exposure beam 5 along its major axis so that the time-integrated illumination if the hologram mask 1 is highly uniform. Larger and smaller steps may also be employed according to the degree of uniformity required. During the scan lines the separation and tilt angle between the hologram mask 1 and substrate 7 where pattern is being locally reconstructed by the exposure beam 5 are continuously measured by the focus modules 26, 27 and corrected (so that the separation corresponds to that between the chrome mask and holographic layer during recording, and so the tilt angle between the substrate 7 and hologram mask 1 in the plane orthogonal to the direction of scanning of the exposure beam 5 where the exposure beam 5 is locally exposing the hologram made 0, ie. so that they are as parallel as possible in this particular plane) using the vertical-axis PZTs 10, 11, 12 in the substrate positioning system 9 in order to accurately print in focus the complete pattern recorded in the hologram mask 1 onto the substrate 7.

In order to minimise the loss of resolution of the printed pattern caused by lateral displacements of the substrate with respect to the hologram mask produced by the tilt corrections (Abbé errors), it is preferable that horizontal-axis PZTs included in the substrate positioning system 9 be employed to continuously compensate for these displacements according to the geometry of the mechanical system. As previously described, it is further advantageous that a 3-axis interferometer system be also configured around the substrate positioning system 9 to ensure that this continuous compensation for Abbé errors during the scanning exposure is accurately achieved.

Using such an exposure strategy in which both the separation and tilt angle are locally and continuously corrected during a raster scan allows the dimension of the exposure beam 5 in the stepping direction to be considerably larger than that possible when exposing with a raster scan according to the prior art which teaches that the separation alone is corrected. This is because the length of the exposure beam 5 in the stepping direction is in practice limited by the non-flatness of the substrate 7 (and to a lesser extent the non-flatness of the vacuum chuck 8 and hologram mask 1) and by the depth of focus of high resolution images. The advantage of being to use a larger length of exposure beam 5 is that it permits a proportionately larger stepping distance between scan passes, and therefore a substantially shorter exposure time and a higher machine throughput. Advantageously, in this embodiment, and in the other embodiments, an electronically controlled shutter may also be included in the path of the exposure beam 5 located, for instance, immediately after the laser source 13, in order to prevent the photoresist on the substrate 7 from being exposed to scattered light when the exposure beam 5 is not scanning across the hologram mask 1. Thus, in this embodiment the shutter would be open when the exposure beam 5 is being scanned across the hologram mask 1, but would close when the exposure beam 5 is being stepped between scan lines.

Figure 3:
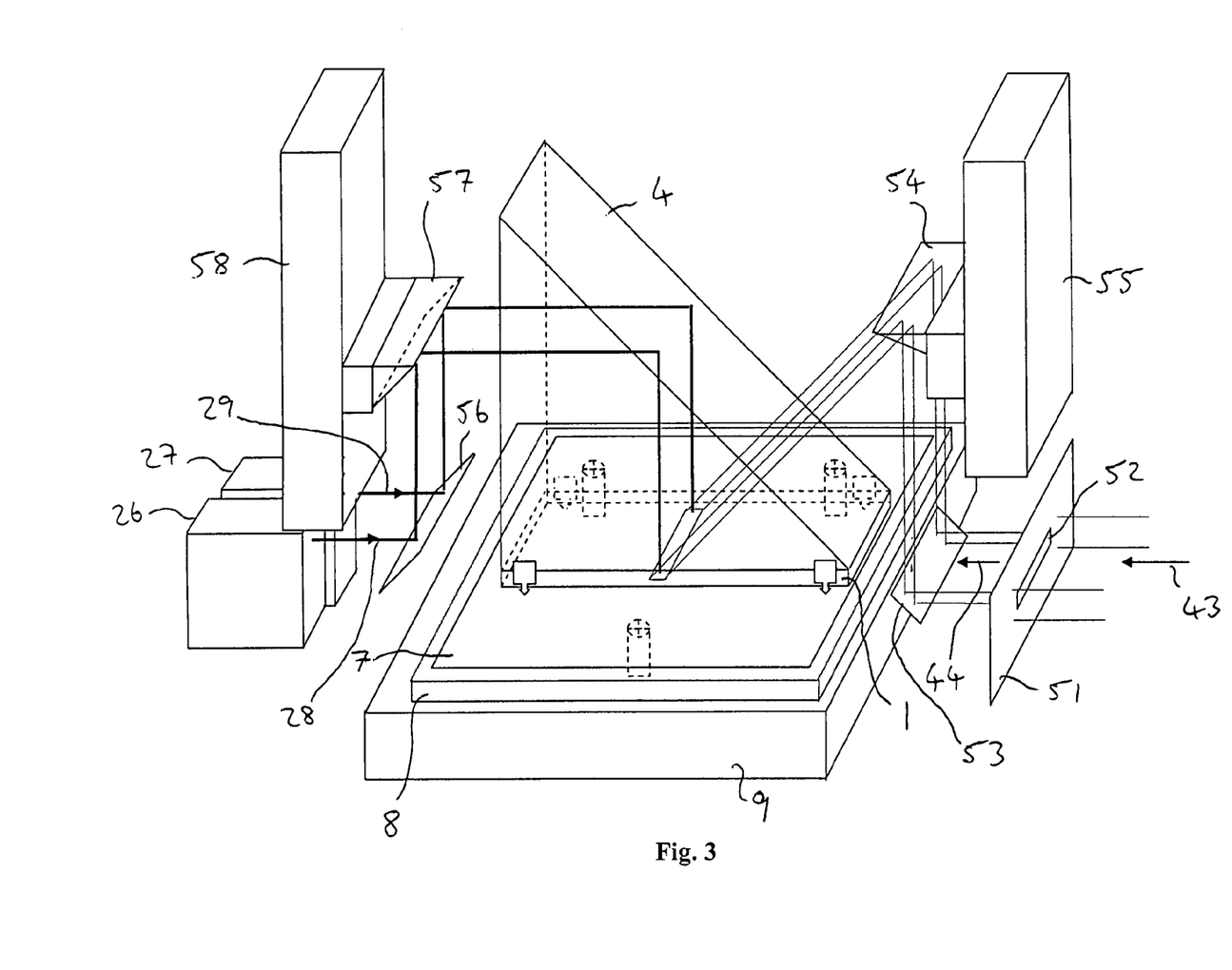
FIG. 3 shows a lithographic system illustrating a second embodiment.
Figure 4:
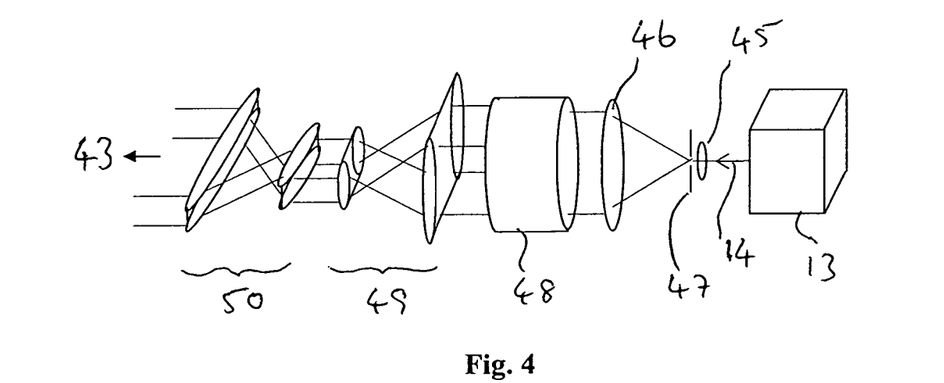
FIG. 4 shows the components of the illumination system employed in the second embodiment.
Figure 5:
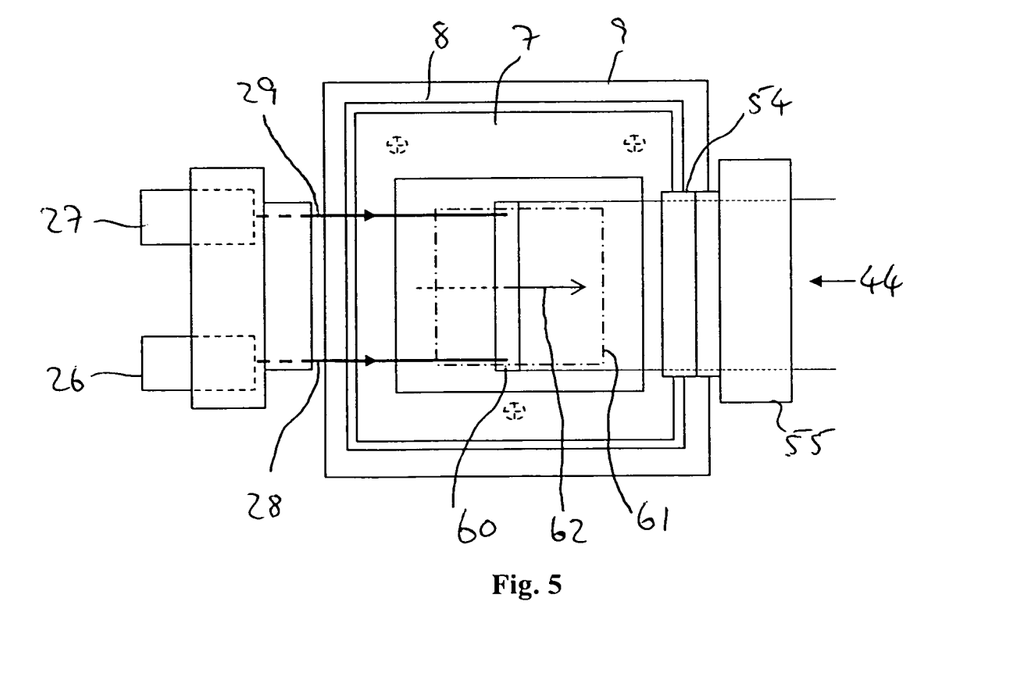
FIG. 5 shows a top-view of certain elements in the second embodiment, illustrating the exposure strategy.

In a second embodiment (see FIG. 3), an illumination beam 43 is incident on a rectangular aperture 52 in a screen 51 such that the transmitted exposure beam 44 has the form of an elongated, rectangular strip of collimated, monochromatic light with substantially uniform intensity along its length. An example of an illumination system for producing such an illumination beam is shown in FIG. 4 in which the output beam 14 from an argon ion laser 13 is first expanded by two lenses 45, 46 to produce a collimated beam of large diameter. A pinhole in a metal plate 47 is included between the lenses 45, 46 to filter out optical noise. The beam from the expander is directed through a refractive Gaussian to top-hat beam transformer 48 (shown schematically, and which may include refractive and/or diffractive elements) that produces a collimated beam with a substantially uniform intensity over its central area. This beam passes through two pairs of cylindrical lenses 49, 50, the first pair 49 compressing the diameter of the beam in the vertical plane and the second pair 50 expanding the beam in the horizontal plane, the output light remaining well collimated. The optical elements in this beam conditioning system are selected in order that the dimensions of the resulting illumination beam 43 over which the intensity is substantially uniform are larger than the respective dimensions of the aperture 52 in the screen 51. It should be mentioned that although the aperture 52 in the screen 51 transmits just the central uniform part of the illumination beam 43, Fresnel diffraction by the edges of the aperture 52 subsequently introduces some intensity modulation into the lightfield at the edges of the beam 44. This elongated-strip exposure beam 44 is then directed by a mirror 53 to a mirror 54 mounted on a single-axis scanning stage 55 that reflects the beam so that it arrives at normal incidence on the hypotenuse face of the prism 4 from where the transmitted beam illuminates the hologram mask 1 at the angle of incidence required for reconstructing the pattern recorded therein. The length of the elongated exposure beam 44 is such that it fully illuminates the width of the area of the hologram recorded in the hologram mask 1. This is better illustrated in FIG. 5, which shows a top-view of certain elements of the first embodiment, in which the area of the hologram being instantaneously illuminated by the exposure beam 44 is indicated by reference numeral 60 and the boundary of the hologram recorded in the hologram mask 1 is indicated by the dashed line 61. The scanning stage 55 is configured to scan the exposure beam 44 in a single line 62 over the complete length of the hologram recorded in the hologram mask 1 to reconstruct the pattern recorded therein.

Alongside the vertical face of the prism 4 is a focus system consisting of two focus measurement modules 26, 27 whose output beams 28, 29 are directed by a mirror 56 to another mirror 57 mounted to a single-axis scanning stage 58 which reflects the beams 28, 29 so that they are incident on the vertical face of the prism 4 and are subsequently illuminate the hologram mask 1 and substrate 7 below it at normal incidence. The relative positions of the two single-axis scanning stages 55, 58 are such that the focus beams 28, 29 are aligned with the ends of the elongated strip exposure beam 44 where it is illuminates the pattern recorded in the hologram mask 1 (see also FIG. 5). The partial reflections of the focus beams 28, 29 from the surfaces of the hologram mask 1 and substrate 7 return back through the prism 4 to the respective focus modules 28, 29 where the spectral components of the signals are electronically analysed to yield the local separations of the hologram mask 4 and substrate 7 where the focus beams 28, 29 illuminate the hologram mask 1. In order that the exposure beam 44 and focus beams 28, 29 can be synchronously scanned across the hologram mask 1, the scanning stages 55, 58 are linked to a central control unit (not shown in the figure) which is also linked to the two focus modules 26, 27 and the PZTs 10, 11, 12 and other actuators in the substrate positioning system 9.

Before exposure starts the coarse motion actuators in the substrate positioning system 9 displace until the four proximity sensors 6 integrated into the bottom surface of the frame for the hologram mask 1 and prism 4 detect that the upper surface of the substrate 7 is substantially level with the hologram mask 1 and separated from it by an amount corresponding to the focal distance of the hologram mask 1. Following this the exposure sequence proceeds by scanning the exposure beam 44 across the hologram mask 1, reconstructing the complete pattern recorded therein. During the scan the two focus modules 26, 27 continuously measure the local separation of the hologram mask 1 and substrate 7 near the edges of the exposure beam 44 where it is reconstructing the pattern recorded in the hologram mask 1, and, in response to these measurements, the PZTs 10, 11, 12 in the substrate positioning system 9 displace in order to accurately correct the measured separations to the value corresponding to the distance of the focal plane of the reconstructed pattern from the surface of the hologram mask 1. The actual displacements required of the PZTs 10, 11, 12 to achieve this need to take into account their configuration in the substrate positioning system 9 in relation to the locations of the measurements. Thus, during the exposure operation, the height of the substrate 7 and its angle of tilt (about a horizontal axis parallel to the direction of scanning of the exposure beam 44) are continuously adjusted such that the upper surface of the substrate 7 remains at the correct distance and substantially parallel to the hologram mask 1 where it is being illuminated by the exposure beam 44, thereby ensuring that the pattern reconstructed from the hologram mask 1 is accurately printed in focus onto the substrate 7.

In the case that the flatness of the substrate glass is significantly better in one direction than in the orthogonal direction (which may arise because of the glass fabrication process), then it is advantageous that the substrate 7 is arranged on the vacuum chuck 7 such that the direction of superior flatness is parallel to the elongated strip exposure beam 44 (in the case of a rectangular chuck, this clearly requires the substrate to be correctly cut from the raw glass sheets). This selection of the orientation of the substrate glass on the vacuum chuck enables the narrow width of the exposure beam 44 and displacements of the vertical-axis PZTs 10, 11, 12 during the scanning to better correct the inferior flatness in the substrate in the scanning direction.

Figure 6:
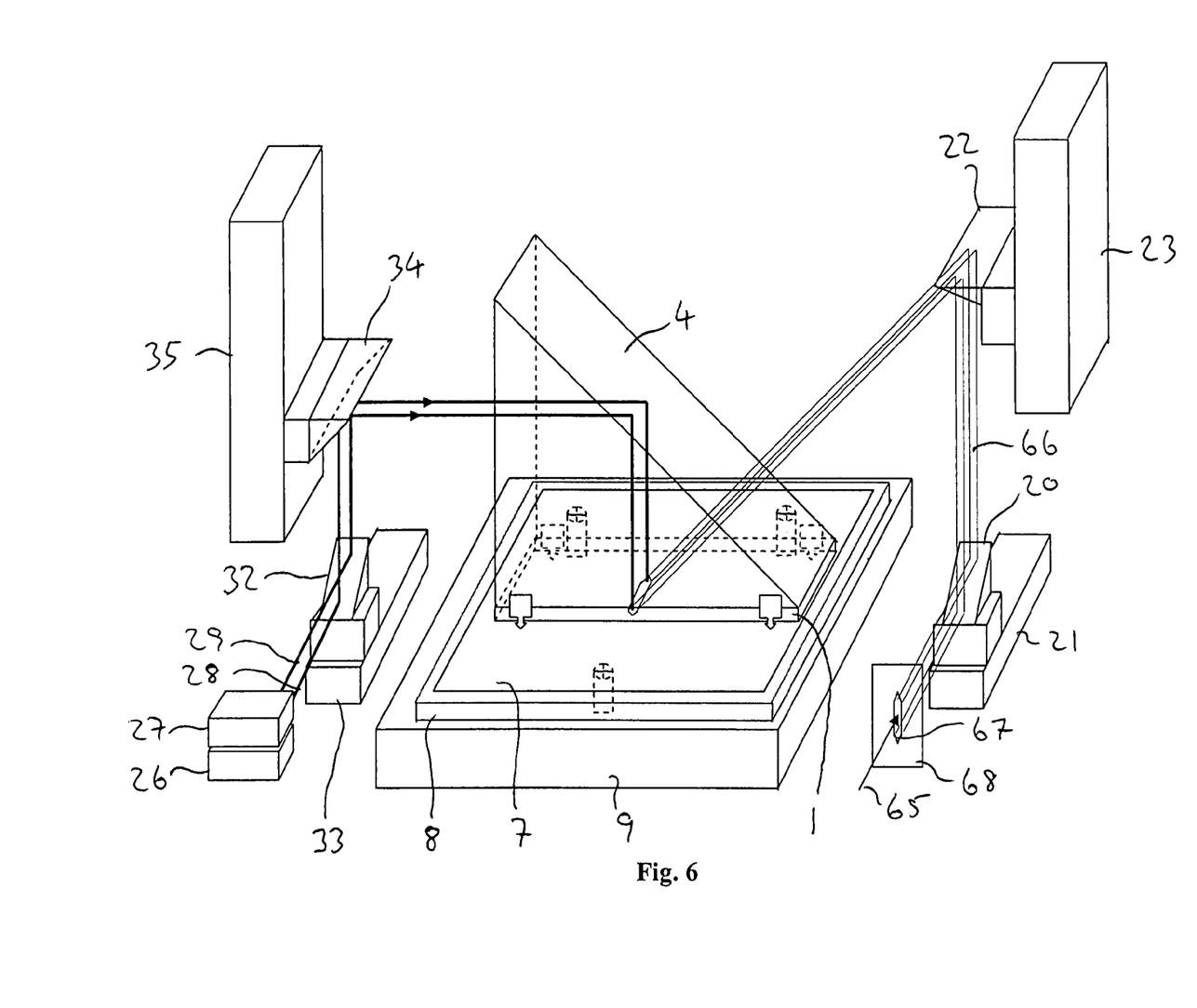
FIG. 6 shows a lithographic system illustrating a third embodiment.

In a third embodiment of the invention, which is illustrated in FIG. 6, an illumination beam 65 from an illumination system similar to that illustrated in FIG. 4 is incident on an aperture 67 in a screen 68 such that the transmitted exposure beam 66 has uniform intensity. In this case the aperture 67 in the screen is orientated vertically instead of horizontally, and rather than its shape being simply rectangular, it has tapered ends, as is more clearly illustrated in FIG. 7. The components of the illumination system are selected and arranged such that the resulting illumination beam 65 provides a uniform illumination of the aperture 67. As a result of the shape of the aperture 67 and the uniform intensity across the transmitted exposure beam 66, the power distribution along the length of the beam 66 (after integrating the power across the width of the beam) has the form depicted in FIG. 8. The exposure beam 66 is then incident on a two-axis scanning system consisting of a first mirror 20 mounted on a lower translation stage 21 and a second mirror 22 mounted on an upper translation stage 23. From the second mirror 22 the beam passes through the hypotenuse face of the prism 4 to the hologram mask 1 at the base of the prism 4. As in the first embodiment, the function of the second mirror 22 and upper translation stage 23 is to scan the exposure beam 66 in a line across the hologram mask 1, whereas the function of the first mirror 20 and the lower translation stage 21 is to step the exposure beam 66 across the hologram mask 1 in a direction orthogonal to that of the scan lines.

The focus system in this embodiment likewise employs two focus modules 26, 27 whose output beams 28, 29 are incident on a second two-axis scanning system comprising a first mirror 32 mounted on a lower translation stage 33 and a second mirror 34 mounted on an upper translation stage 35. As for the exposure system the respective mirrors 32, 34 allow the two focus beams to be scanned in a line across the hologram mask 1 and stepped in the orthogonal direction.

The focus beams 28, 29 reflected from the second mirror 34 of the second scanning system pass through the vertical face of the prism 4 and illuminate the hologram mask 1 and substrate 7 at normal incidence, the surfaces of which partially reflect the beams 28, 29 back to the focus modules 26, 27. The separation of the modules 26, 27 is selected such that the separation of the focus beams 28, 29 at the hologram mask 1 corresponds substantially to the length of the elongated exposure beam 44, and the positions of the translation stages 33, 35 of the focus system in relation to the positions of the translation stages 21, 23 of the exposure system are such that the focus beams 28, 29 illuminate the hologram mask 1 at or near the ends of the area being illuminated by the elongated exposure beam 44. As for the previous embodiments, the translation stages 21, 23, 33, 35, the focus modules 26, 27 and the PZTs 10, 11, 12 in the substrate positioning system 9 are linked to a central control system (not shown in the figure) allowing rapid and automatic interaction between them.

Figure 7:
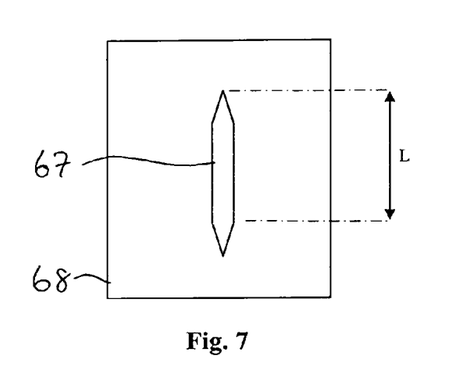
FIG. 7 shows a screen with an aperture employed in the third embodiment.
Figure 8:
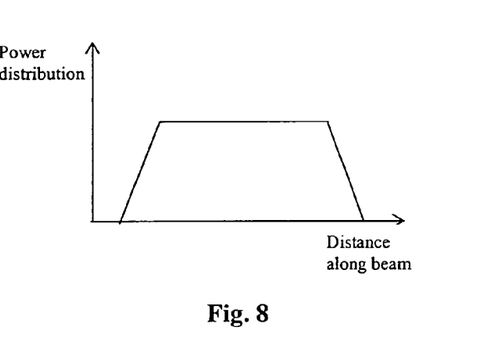
FIG. 8 shows the power distribution along the length of the elongated exposure beam employed in the third embodiment.
Figure 9:
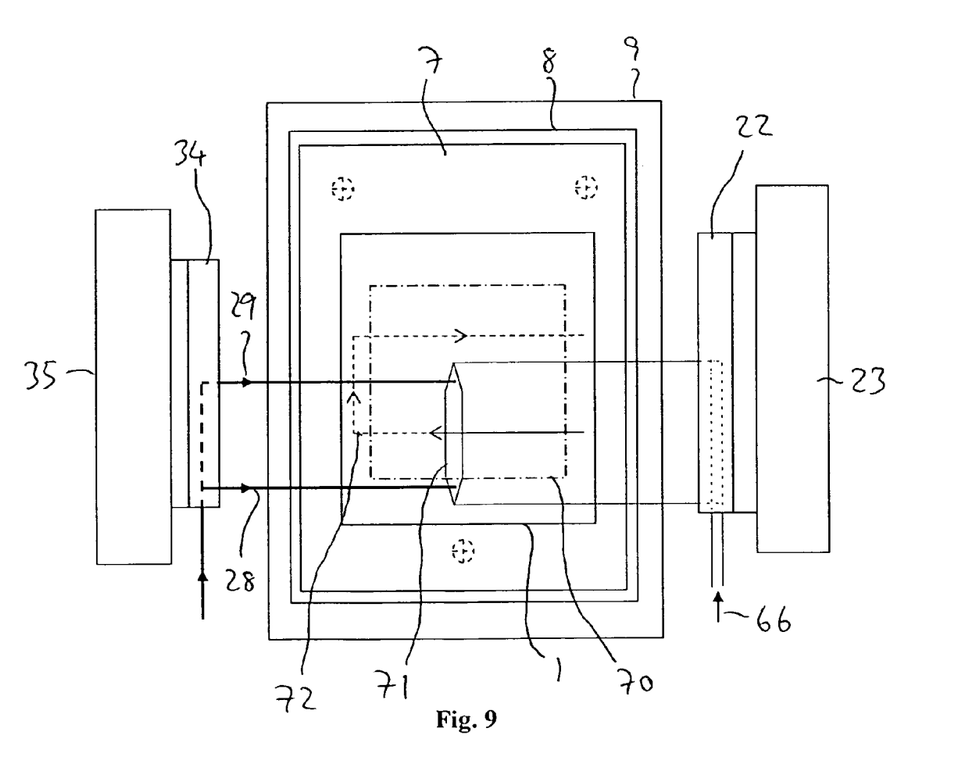
FIG. 9 shows a top-view of certain elements in the third embodiment, illustrating the exposure strategy.

The exposure strategy employed with this apparatus is illustrated in FIG. 9 which shows a top-view of certain elements of the lithographic system depicted in FIG. 7. The boundary of the hologram recorded in the hologram mask 1 is indicated by a dashed line 70 and the area of the hologram being instantaneously illuminated by the exposure beam 1 is indicted by reference numeral 71. The width of the hologram (in the direction parallel to the length of the elongated exposure beam) is just less than twice the dimension L of the elongated exposure beam 66, as defined in FIG. 7 showing the aperture 67 in the screen 68. The exposure sequence consists of firstly displacing the lower translation stages 21, 33 of the two scanning systems so that the exposure and focus beams 66, 28, 29 may print the front half of the pattern recorded in the hologram mask 1. Next the exposure and focus beams 66, 28, 29 are synchronously scanned across the hologram mask 1 by the upper translation stages 23, 35 so that the focus beams 28, 29 continuously measure the separations of the hologram mask 1 and substrate 7 at or near the ends of the area of the hologram 71 being illuminated by the elongated exposure beam 66, and in response to these measurements, the separation and tilt angle between the hologram mask 1 and substrate 7 are continuously adjusted to the value required for printing the first half of the pattern accurately in focus on the substrate 7; following this, the lower translation stages 21, 33 of the two scanning systems displace so that the exposure and focus beams 66, 28, 29 displace across the hologram mask 1 in the orthogonal direction, as indicated by the scan trajectory 72. The stepping distance required in this operation corresponds to the dimension L indicated in FIG. 7. The exposure and focus beams 66, 28, 29 are then scanned in the reverse direction back across the hologram mask 1, again simultaneously measuring and correcting the separation and tilt angle between the hologram mask 1 and substrate 7 where the pattern is being locally reconstructed, thereby printing the second half of the pattern in focus on the substrate 7. The power distribution along the length of the exposure beam 66, as is illustrated in FIG. 8, and the partial overlapping of the two scan lines, in the region of the tapered ends of the beam 66, ensure a high uniformity of the time-integrated exposure energy density across the boundary between the two scan lines.

Clearly the apparatus shown in FIG. 6 and the exposure strategy illustrated in FIG. 9 may be extended to print patterns recorded in the hologram mask 1 whose width is three or more times the length of the elongated exposure beam 66, using respectively three or more scan lines of the exposure and focus beams 66, 28, 29 across the hologram mask 1 and two or more steps of the beams 66, 28, 29 in the orthogonal direction between scan lines. Also, other shapes of aperture 67 and indeed types of laser source and beam conditioning system with or without an aperture may be employed to achieve the same advantages offered by this particular embodiment of the invention.

Figure 10:
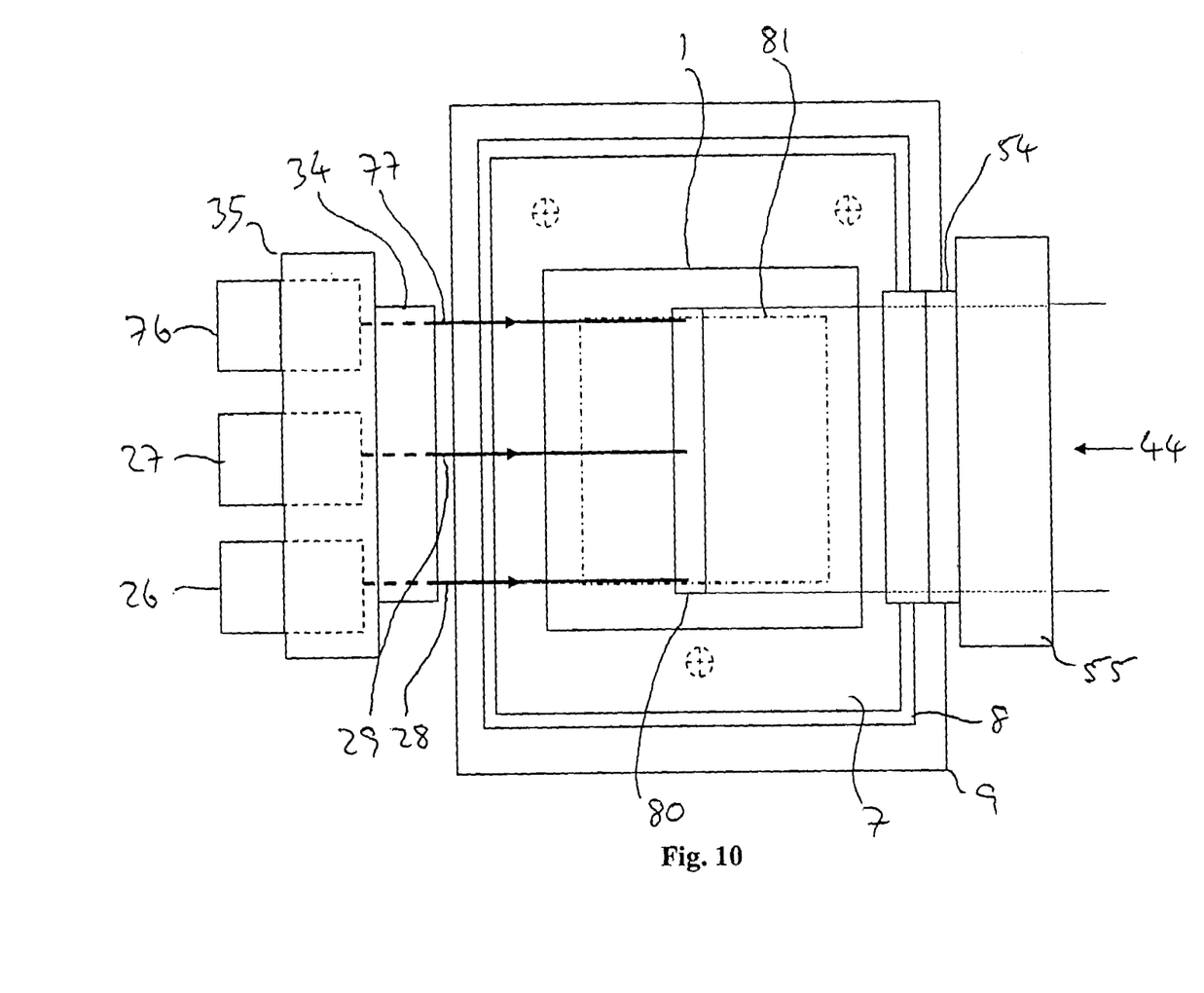
FIG. 10 shows a top view of certain elements in a fourth embodiment, illustrating also the exposure strategy.

A fourth embodiment of the invention, illustrated in FIG. 10 (only certain elements shown) is a modified version of the second embodiment, wherein the focus system comprises three focus modules 26, 27, 76 whose output beams 28, 29, 77 are directed to a mirror 34 on a single-axis scanning stage 35 beside the vertical face of the prism 4 which reflects the three beams 28, 29, 77 so that they are incident on respectively the centre and the two ends of the area of the hologram 80 being instantaneously illuminated by elongated exposure beam 44. The extent of the area of the hologram mask 1 in which the hologram is recorded is indicated by reference numeral 81. The three measurements of the local separation of the hologram mask 1 and substrate 7 thus obtained allow a more accurate determination of the variation of the separation of the hologram mask 1 and substrate 7 across the length of the area of the hologram mask 80 being illuminated by the exposure beam 44. Such variations arise because none of the substrate 7, the vacuum chuck 8 and the hologram mask 1 has a perfectly flat surface. Since, in this case, the 3 measurements of the local separations do not in general correspond to an exactly linear variation of the separation between the hologram mask 1 and the substrate 7 separation across the length of the area of the hologram 80 illuminated by the exposure beam 44, the variation needs to be approximated by a linear fit calculated according to standard methods. The resulting linear approximation is then employed to determine the corrections required of the individual PZTs 10, 11, 12 for optimising the position of the substrate surface with respect to the focal plane of the pattern being locally reconstructed from the hologram mask 1 by the exposure beam 44. As for the first embodiment, the scanning motions of the exposure and focus beams 44, 28, 29, 77 are synchronised by a control system to accurately print the complete pattern from the hologram mask 1 onto the substrate 7. Clearly, further embodiments can extend the principle of the invention to four or a larger number of focus modules for producing more information on the variation of the separation between the hologram mask 1 and substrate 7 to permit a more accurate determination and correction of the their parallelism and separation.

Figure 11:
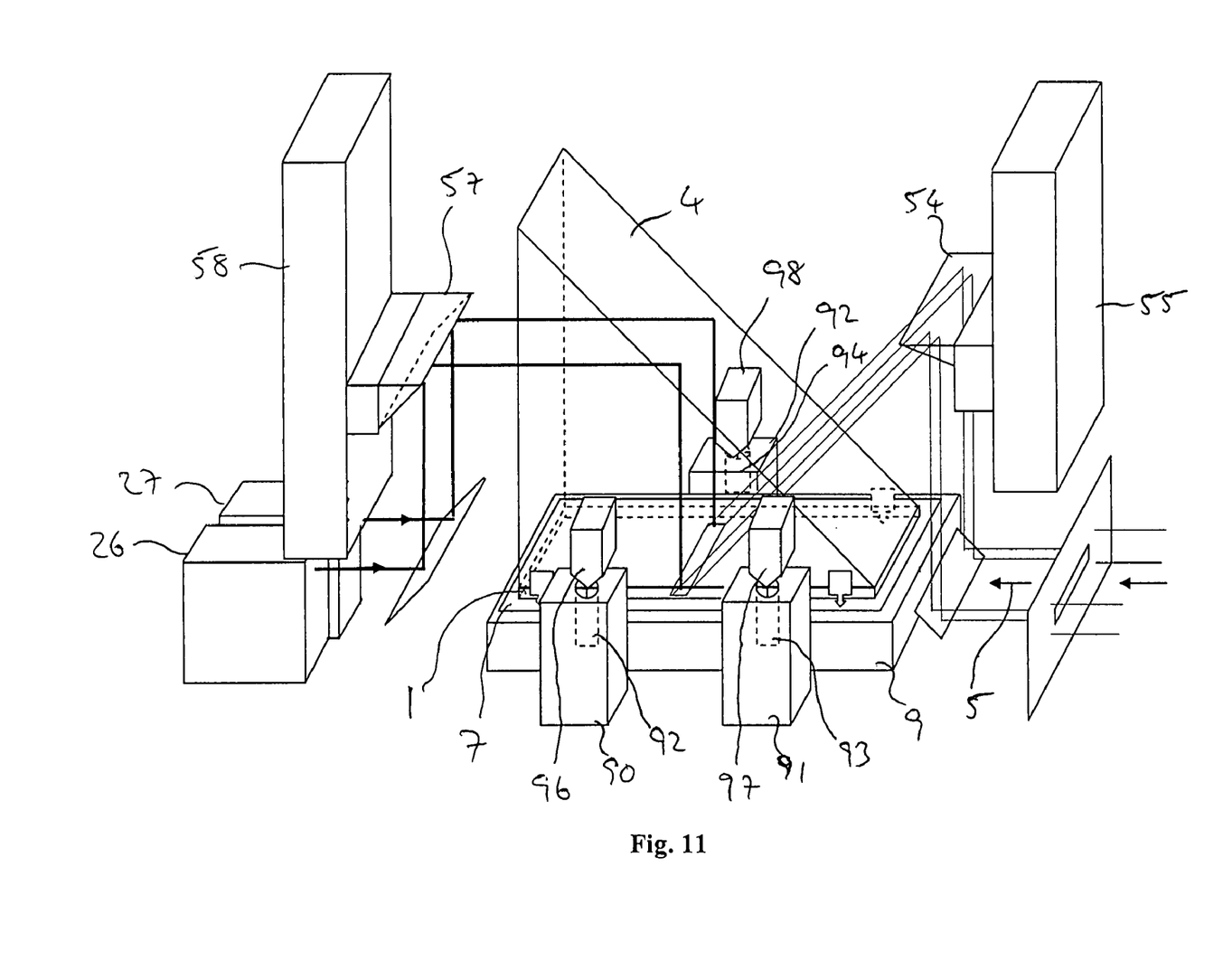
FIG. 11 shows a lithographic system illustrating a fifth embodiment.

The fifth embodiment of the invention shown in FIG. 11 is a modification of the second embodiment in which instead of there being three vertical-axis PZTs integrated in the substrate positioning system 9 for accurately adjusting the separation and parallelism between the hologram mask 1 and substrate 7 during the scanning exposure, a positioning system is provided for the hologram mask 1 and prism 4 constituting three supporting platforms 90, 91, 92 in which are respectively integrated three vertical-axis PZTs 93, 94, 95, above which the prism 4 engages via interfacing elements 96, 97, 98 attached to the mechanical frame (not explicitly shown) holding the prism 4. Thus, equivalently, as the elongated exposure beam 5 is scanned across the hologram mask 1, the height and tilt angle of hologram mask 1 are continuously adjusted by the vertical-axis PZTs 93, 94, 95 in the supporting platforms 90, 91, 92 of the prism positioning system in response to the measurements by the focus modules 26, 27 of the separation of the hologram mask 1 and substrate 7 so that the pattern reconstructed by the hologram mask 1 is accurately printed in focus in the photoresist layer on the substrate 7.

Whereas each of the embodiments above describe and show a measurement and correction of the tilt angle between the hologram mask 1 and substrate 7 in only the plane orthogonal to the direction of scanning of the exposure beam, other embodiments of the invention may additionally or alternatively measure and correct the tilt angle between the hologram mask 1 and substrate 7 in the direction of scanning, that is, across the width of the elongated exposure beam. These embodiments require different configurations of the focus system and possibly additionally focus modules and associated optical and mechanical components. Correction of the tilt angle between the hologram mask 1 and substrate 7 in the direction of scanning is, however, not important for machine throughput and has less impact on the quality of the printed pattern because the dimension of the exposure beam in this direction is small, so deviations of the substrate surface from the focal plane of the reconstructed image are negligible.

The invention claimed is:

1. A method for printing a pattern from a total internal reflection hologram of a hologram mask into a photosensitive layer on a substrate, which method includes:
   a) arranging the hologram mask on a first face of a coupling element;
   b) arranging the substrate so that it is substantially parallel with the hologram mask and such that the photosensitive layer is separated from the hologram by an amount substantially corresponding to the focal distance of the hologram mask;
   c) reconstructing the pattern recorded in the hologram by scanning an exposure beam of substantially collimated light across the hologram mask through a second face of the coupling element while simultaneously measuring the local separation between the hologram and photosensitive layer in at least two locations where the pattern is being instantaneously reconstructed by the exposure beam by scanning at least two focus beams across the hologram mask through the second or a third face of said coupling element and, in response to said measurements by the focus beams, continuously adjusting both the separation of the hologram mask and substrate and the angle of tilt between them in at least the plane orthogonal to the direction of motion of the scanning beams, in order that the pattern reconstructed from the hologram is accurately printed in focus into the photosensitive layer.

2. A method according to claim 1, wherein the exposure beam is scanned in a raster pattern comprising a sequence of partially overlapping scan lines parallel to a first direction, wherein the focus beams measure the local separation of the hologram and photosensitive layer at locations separated in a direction orthogonal to the first direction, and wherein the angle of tilt between the hologram mask and substrate is continuously adjusted in the plane orthogonal to the first direction.

3. A method according to claim 2, wherein the intensity profile of the exposure beam in the plane of the hologram and in a direction orthogonal to the first direction is substantially Gaussian.

4. A method according to claim 2, wherein the exposure beam is in the form of an elongated strip of light whose intensity profile in the plane of the hologram and in a direction orthogonal to the first direction is substantially flat with tapered ends.

5. A method according to claim 1, wherein the exposure beam is scanned across the hologram mask in a single scan line and is in the form of an elongated strip of light whose intensity profile in the plane of the hologram and in a direction orthogonal to the scan line is substantially flat across that part of the beam reconstructing the pattern recorded in the hologram, wherein the focus beams measure the local separations between the hologram mask and substrate in at least two locations separated in a direction orthogonal to the scan line, and wherein the angle of tilt between the hologram mask and substrate is continuously adjusted in the plane orthogonal to the scan line.

6. A method according to claim 1 wherein the adjustments of the separation and angle of tilt between the hologram mask and substrate are performed by displacements of the substrate.

7. A method according to claim 1 wherein the adjustments of the separation and angle of tilt between the hologram mask and substrate are performed by displacements of the prism and hologram mask.

8. A method according to claim 1, wherein the surface of the substrate bearing the photosensitive layer is flatter in one direction than an orthogonal direction and wherein the exposure beam is scanned in a single scan line or in a raster pattern comprising a sequence of partially overlapping scan lines such that the direction of the or each scan line is parallel to the direction of inferior flatness of the surface of the substrate.

9. An apparatus for printing a pattern from a total internal reflection hologram of a hologram mask into a photosensitive layer on a substrate, which apparatus includes:
   a) a coupling element having a first face for arranging the hologram mask thereon;
   b) a carrier for arranging the substrate thereon;
   c) at least one positioning means having actuators for arranging that the substrate is substantially parallel to and in proximity to the hologram mask and for adjusting the separation of the hologram and photosensitive layer and the angle of tilt between them in at least one of two orthogonal planes;
   d) an exposure means for generating a beam of substantially collimated light and for reconstructing the pattern recorded in the hologram by scanning said beam over the hologram mask through a second face of the coupling element;
   e) a focus means for generating at least two focus beams, scanning said beams over the hologram mask through the second or a third face of the coupling element, and for simultaneously measuring the local separation between the hologram and photosensitive layer in at least two locations where the pattern is being instantaneously reconstructed by said scanning exposure beam;
   f) a control means for adjusting using the positioning means the separation of the hologram mask and substrate and the angle of tilt between them in at least one of two orthogonal planes in response to said measurements by the focus means so that the pattern reconstructed from the hologram by the exposure means is accurately printed in focus into the photosensitive layer.

10. An apparatus according to claim 9, wherein the exposure means scans the exposure beam in a raster pattern comprising a sequence of partially overlapping scan lines parallel to a first direction, wherein the focus means measures the local separations of the hologram mask and substrate in at least two locations separated in a direction orthogonal to the first direction, and wherein the tilt angle between the hologram mask and substrate is adjusted in a direction orthogonal to the first direction.

11. An apparatus according to claim 10, wherein the exposure means generates a beam whose intensity profile in the plane of the hologram and in a direction orthogonal to the first direction is substantially Gaussian.

12. An apparatus according to claim 10, wherein the exposure means generates a beam in the form of an elongated strip of light whose intensity profile in the plane of the hologram and in a direction orthogonal to the first direction is substantially flat with tapered ends.

13. An apparatus according to claim 9, wherein the exposure means scans the beam across the hologram mask in a single scan line and generates the beam in the form of an elongated strip of light whose intensity profile in the plane of the hologram and in a direction orthogonal to the scan line is substantially flat across that part of the beam reconstructing the pattern recorded in the hologram, wherein the focus means continuously measures the local separations between the hologram and photosensitive layer in at least two locations separated in a direction orthogonal to the scan line, and wherein the control means continuously adjusts using the positioning means the angle of tilt between the hologram mask and substrate in the plane orthogonal to the scan line.

14. An apparatus according to claim 9 wherein the actuators of a single positioning means displace the carrier and substrate.

15. An apparatus according to claim 9, wherein the actuators of a single positioning means displace the coupling element and hologram mask.

16. An apparatus according to claim 9, wherein the actuators of a first positioning means displace the carrier and substrate and the actuators of a second positioning means displace the coupling element and hologram mask.

* * * * *